United States Patent
Reunamäki et al.

(10) Patent No.: US 9,735,860 B2
(45) Date of Patent: *Aug. 15, 2017

(54) NON-NETWORKED WIRELESS COMMUNICATION

(75) Inventors: Jukka Reunamäki, Tampere (FI); Arto Palin, Viiala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/002,880

(22) PCT Filed: Mar. 18, 2011

(86) PCT No.: PCT/FI2011/050231
§ 371 (c)(1),
(2), (4) Date: Sep. 3, 2013

(87) PCT Pub. No.: WO2012/127095
PCT Pub. Date: Sep. 27, 2012

(65) Prior Publication Data
US 2013/0337748 A1  Dec. 19, 2013

(51) Int. Cl.
*H04B 7/00* (2006.01)
*H04B 7/26* (2006.01)
(Continued)

(52) U.S. Cl.
CPC .............. *H04B 7/26* (2013.01); *H04W 8/005* (2013.01); *H04W 56/0045* (2013.01);
(Continued)

(58) Field of Classification Search
CPC . H04W 40/22; H04W 40/244; H04W 40/246; H04W 84/18; H04W 84/20;
(Continued)

(56) References Cited

U.S. PATENT DOCUMENTS 7,986,718 B2 *  7/2011  Monier ................. G01D 4/004
                                                            370/255
8,588,688 B2 * 11/2013  Reunamaki et al. ........ 455/41.2
(Continued)

FOREIGN PATENT DOCUMENTS

EP      1187504     3/2002
EP      1418781     6/2012
(Continued)

OTHER PUBLICATIONS

International Search Report and Written Opinion received for corresponding Patent Cooperation Treaty Application No. PCT/FI2011/050231, dated Dec. 19, 2011, 13 pages.
(Continued)

*Primary Examiner* — Duc M Nguyen
(74) *Attorney, Agent, or Firm* — Locke Lord LLP

(57) ABSTRACT

According to one embodiment, the invention relates to a method comprising: transmitting (410), by an apparatus, a message to detect one or more wireless communication devices; receiving (420), in response to the transmitted message, at least one response message comprising at least identification information regarding a wireless communication device; determining (430) that the apparatus has data suitable for transmitting to the wireless communication device without establishing a formal communication connection with the wireless communication device; and transmitting (440) one or more subsequent messages to the wireless communication device in response to the received response message, wherein the one or more subsequent messages comprise at least the data suitable for transmitting to the wireless communication device without establishing a formal communication connection.

2 Claims, 7 Drawing Sheets

(51) Int. Cl.
*H04W 8/00* (2009.01)
*H04W 56/00* (2009.01)
*H04W 84/18* (2009.01)

(52) U.S. Cl.
CPC .................. *H04B 2201/713* (2013.01); *H04B 2201/71346* (2013.01); *H04W 84/18* (2013.01)

(58) Field of Classification Search
CPC ....... H04W 4/008; H04B 5/00; H04B 5/0031; H04B 1/713; H04B 2201/713; H04B 2201/71346
USPC ........................... 455/41.1, 41.2, 41.3, 426.1
See application file for complete search history.

(56) References Cited

U.S. PATENT DOCUMENTS

| | | | |
|---|---|---|---|
| 2001/0029166 A1* | 10/2001 | Rune et al. ...................... 455/41 |
| 2003/0189977 A1* | 10/2003 | Sweitzer ............... H04L 1/0002 |
| | | | 375/222 |
| 2003/0198208 A1* | 10/2003 | Koos, Jr. ............... H04W 88/04 |
| | | | 370/338 |
| 2004/0162059 A1* | 8/2004 | Hiltunen et al. ........... 455/412.1 |
| 2005/0156712 A1* | 7/2005 | Jyrinki ..................... 340/286.01 |
| 2005/0180425 A1* | 8/2005 | Ruuska et al. ............. 370/395.2 |
| 2006/0240777 A1 | 10/2006 | Ruuska |
| 2006/0267794 A1 | 11/2006 | Lee et al. |
| 2007/0206660 A1 | 9/2007 | Lifchuk |
| 2007/0263551 A1* | 11/2007 | Birchler ................ H04L 45/123 |
| | | | 370/254 |
| 2008/0013502 A1 | 1/2008 | Clark |
| 2008/0161026 A1 | 7/2008 | Wiatrowski et al. |
| 2008/0305815 A1* | 12/2008 | McDonough ................. 455/466 |
| 2008/0320165 A1* | 12/2008 | Jeon ........................ H04L 45/16 |
| | | | 709/242 |
| 2009/0163216 A1* | 6/2009 | Hoang et al. .................. 455/450 |
| 2009/0180519 A1* | 7/2009 | Lee et al. ...................... 375/130 |
| 2009/0304128 A1* | 12/2009 | Izumi ..................... H04L 7/042 |
| | | | 375/343 |
| 2009/0320098 A1 | 12/2009 | Roberts et al. |
| 2010/0061272 A1* | 3/2010 | Veillette ........................ 370/254 |
| 2010/0079005 A1 | 4/2010 | Hyde et al. |
| 2010/0105409 A1 | 4/2010 | Agarwal et al. |
| 2010/0118736 A1 | 5/2010 | Chung et al. |
| 2010/0250135 A1* | 9/2010 | Li et al. ......................... 701/300 |
| 2010/0291952 A1* | 11/2010 | Gosset et al. ................. 455/466 |
| 2011/0103264 A1* | 5/2011 | Wentink ................ H04W 8/005 |
| | | | 370/255 |
| 2011/0103428 A1 | 5/2011 | Chan |
| 2011/0280234 A1* | 11/2011 | Wentink ................ H04W 8/005 |
| | | | 370/338 |
| 2012/0081235 A1* | 4/2012 | Nadeem et al. .............. 340/933 |
| 2012/0190302 A1* | 7/2012 | Reunamaki et al. ......... 455/41.2 |
| 2013/0065584 A1 | 3/2013 | Lyon et al. |
| 2015/0017979 A1* | 1/2015 | Kang .................... H04W 8/005 |
| | | | 455/426.1 |
| 2015/0256954 A1 | 9/2015 | Carlsson et al. |
| 2015/0304209 A1 | 10/2015 | Choudhury et al. |
| 2015/0341876 A1 | 11/2015 | Abraham et al. |
| 2016/0072573 A1 | 3/2016 | Tohzaka et al. |

FOREIGN PATENT DOCUMENTS

| | | |
|---|---|---|
| KR | 20110032370 | 3/2011 |
| WO | WO2005091573 | 9/2005 |

OTHER PUBLICATIONS

Lee, S-H. et al. Bluetooth 2.1 based emergency data delivery system in HealthNet. Wireless Communications and Networking Conference, WCNC 2008. Ed Y. Wen et al. New Jersey: IEEE 2008. pp. 3057-3062.

Lee U. et al. P2P content distribution to mobile Bluetooth users. IEEE Transactions on Vehicular Technology. Jan. 2010. vol. 59. No. 1 pp. 356-367.

6.5 Packet Types, Baseband Specification, Bluetooth Specification Version 4.0 [vol. 2], p. 117-121, Jun. 30, 2010.

8 Extended Inquiry Response Data Format, Generic Access Profile, Bluetooth Specification Version 4.0 [vol. 3], p. 330-334, Jun. 30, 2010.

"Bluetooth Specification version 4.2", Bluetooth SIG, Dec. 2, 2014 (Dec. 2, 2014), XP055359393, Retrieved from the Internet: URL:https://www.bluetooth.com/specificatio.ns/adopted-specifications [retrieved on Mar. 28, 2017] p. 255, paragraph 4.1.4—p. 255, paragraph 4.1.4.

Greg Stewart: "Can BLE advertise while being connected ?", TI E2E Community—Bluetooth low energy Forum, Nov. 20, 2014 (Nov. 20, 2014), XP002769355, Retrieved from the Internet: URL:https://e2e.ti.com/support/wireless_connectivity/bluetooth_low_energy/f/538/t/383746 [retrieved on Apr. 19, 2017] the whole document.

European Search Report dated Apr. 24, 2017 for Application No. EP 17 15 4094.

2.3 Advertising Channel PDU, Link Layer Specification, Bluetooth Specification Version 4.2 [vol. 6, Part B], pp. 39-45, Dec. 2, 2014.

\* cited by examiner

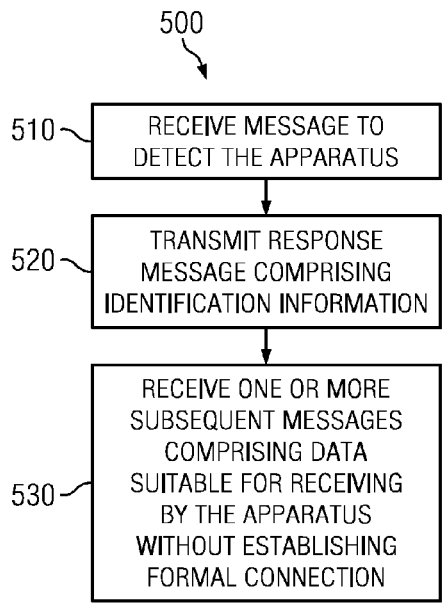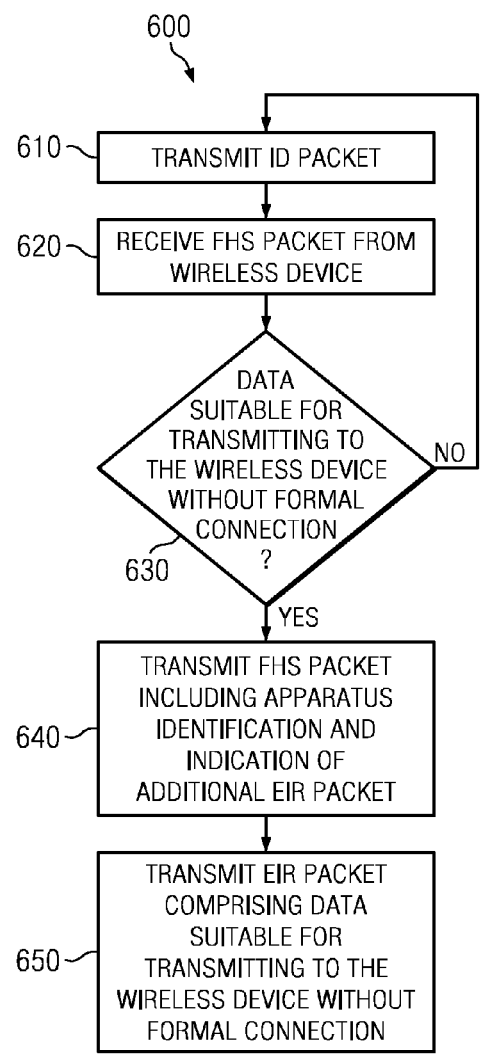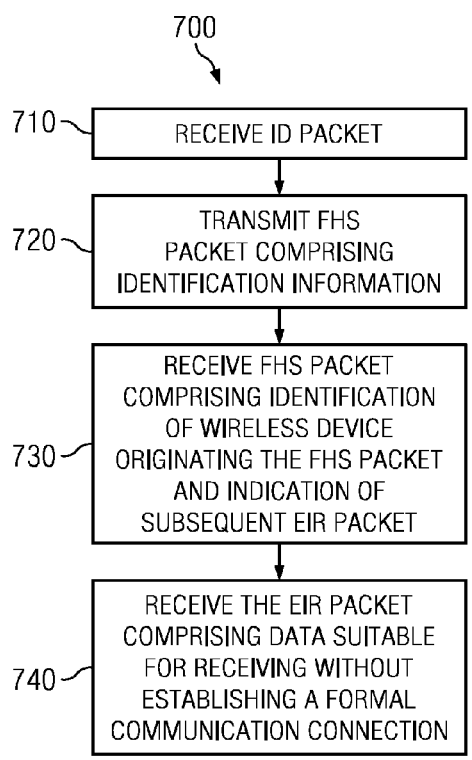

1

NON-NETWORKED WIRELESS COMMUNICATION

RELATED APPLICATION

This application was originally filed as PCT Application No. PCT/FI2011/050231 filed Mar. 18, 2011.

TECHNICAL FIELD

The present application relates generally to wireless communication, more particularly to wireless communication in non-networked manner.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing an electrical network as a power source. Due to rapid development of the wireless communication devices a number of areas capable of enabling entirely new types of communication applications have emerged.

In order to exchange information with other devices, a wireless communication device needs to first detect other devices that are within communication range. After device detection, one or more wireless communication links may be established with one or more of the other devices in order for the devices to communicate by way of exchanging information over a wireless network. While established wireless communication links allow devices to exchange information, the establishment and maintenance of said wireless communication links consumes resources of the wireless communication device.

SUMMARY

Various aspects of examples of the invention are set out in the claims.

According to a first aspect of the present invention, a method is provided comprising transmitting, by an apparatus, a message to detect one or more wireless communication devices within a coverage area of the apparatus; receiving, in response to the transmitted message, at least one response message comprising at least identification information regarding a wireless communication device within the coverage area; determining that the apparatus has data suitable for transmitting to the detected wireless communication device without establishing a formal communication connection with the detected wireless communication device; and transmitting one or more subsequent messages to the detected wireless communication device in response to the received response message, wherein the one or more subsequent messages comprise at least the data suitable for transmitting to the detected wireless communication device without establishing a formal communication connection.

According to a second aspect of the present invention, a computer program product is disclosed, adapted to cause performing of the method according to the first aspect when said program is run on a computer.

According to a third aspect of the present invention, an apparatus is disclosed, comprising means for transmitting, by the apparatus, a message to detect one or more wireless communication devices within a coverage area of the apparatus; means for receiving, in response to the transmitted message, at least one response message comprising at least identification information regarding a wireless communication device within the coverage area; means for determining that the apparatus has data suitable for transmitting to the detected wireless communication device without establishing a formal communication connection with the detected wireless communication device; and means for transmitting one or more subsequent messages to the detected wireless communication device in response to the received response message, wherein the one or more subsequent messages comprise at least the data suitable for transmitting to the detected wireless communication device without establishing a formal communication connection.

According to a fourth aspect of the present invention, a method is provided comprising receiving, by an apparatus, a message to detect the apparatus; transmitting, in response to the received message, a response message comprising at least identification information regarding the apparatus; and receiving one or more subsequent messages in response to the transmitted response message, wherein the one or more subsequent messages comprise at least data suitable for receiving by the apparatus without establishing a formal communication connection with a wireless communication device originating the messages.

According to a fifth aspect of the present invention, a computer program product is disclosed, adapted to cause performing of the method according to the fourth aspect when said program is run on a computer.

According to a sixth aspect of the present invention, an apparatus is disclosed, comprising means for receiving, by the apparatus, a message to detect the apparatus; means for transmitting, in response to the received message, a response message comprising at least identification information regarding the apparatus; and means for receiving one or more subsequent messages in response to the transmitted response message, wherein the one or more subsequent messages comprise at least data suitable for receiving by the apparatus without establishing a formal communication connection with a wireless communication device originating the messages.

According to a seventh aspect of the present invention, a method is disclosed, comprising transmitting, by an apparatus, an ID packet to detect one or more wireless short-range communication devices within a short-range communication coverage area of the apparatus; receiving, in response to the transmitted ID packet, a frequency hopping synchronization (FHS) packet from at least one wireless short-range communication device within the coverage area, wherein the received FHS packet comprise at least identification information regarding the wireless short-range communication device; determining that the apparatus has data suitable for transmitting to the detected wireless short-range communication device without establishing a formal communication connection; transmitting a FHS packet comprising at least identification information regarding the apparatus and an indication of an additional extended inquiry response (EIR) packet in response to the received FHS packet; and transmitting the EIR packet comprising the data suitable for transmitting to the detected wireless short-range communication device without establishing a formal communication connection.

According to an eight aspect of the present invention, a computer program product is disclosed, adapted to cause performing of the method according to the seventh aspect when said program is run on a computer.

According to a ninth aspect of the present invention, an apparatus is disclosed, comprising means for transmitting an ID packet to detect one or more wireless short-range communication devices within a short-range communication coverage area of the apparatus; means for receiving, in response to the transmitted ID packet, a frequency hopping synchronization (FHS) packet from at least one wireless short-range communication device within the coverage area, wherein the received FHS packet comprise at least identification information regarding the wireless short-range communication device; means for determining that the apparatus has data suitable for transmitting to the detected wireless short-range communication device without establishing a formal communication connection; means for transmitting a FHS packet comprising at least identification information regarding the apparatus and an indication of an additional extended inquiry response (EIR) packet in response to the received FHS packet; and means for transmitting the EIR packet comprising the data suitable for transmitting to the detected wireless short-range communication device without establishing a formal communication connection.

According to a tenth aspect of the present invention a method is disclosed, comprising receiving, by an apparatus, an ID packet for detecting the apparatus; transmitting, in response to the received ID packet, a frequency hopping synchronization (FHS) packet comprising at least identification information regarding the apparatus; receiving, in response to the transmitted FHS packet, a FHS packet comprising at least identification information regarding a wireless short-range communication device originating the FHS packet and an indication of a subsequent extended inquiry response (EIR) packet; and receiving the EIR comprising data suitable for receiving by the apparatus without establishing a formal communication connection with the wireless short-range communication device.

According to an eleventh aspect of the present invention, a computer program product is disclosed, adapted to cause performing of the method according to the tenth aspect when said program is run on a computer.

According to a twelfth aspect of the present invention an apparatus is disclosed, comprising means for receiving an ID packet for detecting the apparatus; means for transmitting, in response to the received ID packet, a frequency hopping synchronization (FHS) packet comprising at least identification information regarding the apparatus; means for receiving, in response to the transmitted FHS packet, a FHS packet comprising at least identification information regarding a wireless short-range communication device originating the FHS packet and an indication of a subsequent extended inquiry response (EIR) packet; and means for receiving the EIR comprising data suitable for receiving by the apparatus without establishing a formal communication connection with the wireless short-range communication device.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

BRIEF DESCRIPTION OF THE DRAWINGS

For a more complete understanding of example embodiments of the present invention, reference is now made to the following descriptions taken in connection with the accompanying drawings in which:

FIG. 7 illustrates an example flow diagram showing operations for receiving one or more messages from a device without establishing a formal connection according to an example embodiment of the present invention;

FIG. 8 illustrates an example flow diagram showing operations for Bluetooth™ communication protocol based message transmission without establishing a formal connection according to an example embodiment of the present invention;

FIG. 9 illustrates an example flow diagram showing operations for Bluetooth™ communication protocol based message receiving without establishing a formal connection according to an example embodiment of the present invention.

DETAILED DESCRIPTION OF THE DRAWINGS

Example embodiments of the present invention and their potential effects are understood by referring to FIGS. 1 through 10 of the drawings.

Figure 1:
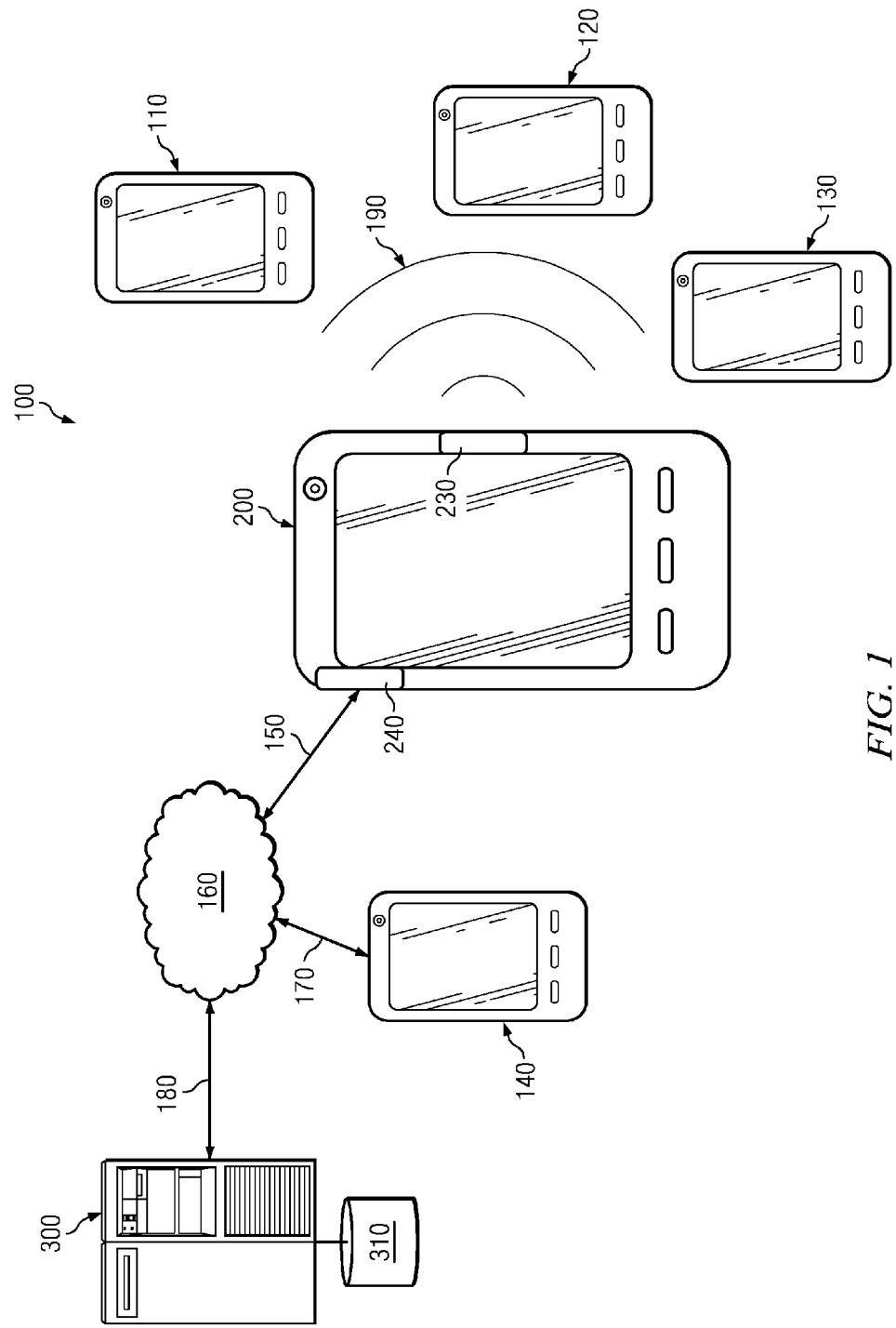
FIG. 1 discloses an example of operational environment in which apparatuses according to an example embodiment of the invention may be used.

FIG. 1 discloses an example of operational environment 100 in which various apparatuses according to an example embodiment of the invention may be used. An apparatus 200, for example a personal computer, an engineering workstation, a personal digital assistant, a portable computer, a computerized watch, a wired or wireless terminal, mobile phone, node, and/or the like, a set-top box, a personal video recorder (PVR), an automatic teller machine (ATM), a game console, or the like is shown having short-range communication means, such as a short-range communications interface 230, configured to communicate wirelessly with various short-range communication devices, such as a devices 110, 120 and 130 via a short-range communication connection. Short-range communication connections may be used for the exchange of information over a local area varying for example from a couple of meters to some hundred of meters. Examples of wireless short-range communication technologies comprise Bluetooth™, Bluetooth™ Low Energy, WLAN, wireless universal serial bus (WUSB), ultra-wideband (UWB), ZigBee (802.15.4, 802.15.4a), and ultra high frequency radio-frequency identification (UHF RFID) technologies. Apparatus 200 may further be embodied as a portable wireless communications device equipped with wide-area communication means, such as long-range communications interface 240 to connect with network 160 via a wireless communication link 150 to communicate for example either with a wireless communication device 140, or with a remote server 300 as illustrated in FIG. 1.

Depending on the embodiment, the wireless communication link 150 may be provided over a wide-area communication connection. Examples of wireless wide-area communication technologies comprise $2^{nd}$ generation (2G) digital cellular networks, for example Global System for Mobile Communications (GSM) that operates in the 900 MHz/1.8 GHz bands in Europe and in the 850 MHz and 1.9 GHz bands in the United States. Wide-area communication technologies may further comprise general packet radio service (GPRS) technology, universal mobile telecommunications system (UMTS) technology, code division multiple access (CDMA) technologies, 3GPP Long Term Evolution (LTE) technologies, and/or the like.

According to an alternative example embodiment, link 150 may be provided with a wired connection. Examples of wired communication technologies include ethernet, IEEE 1394, universal serial bus (USB) protocol, any other serial or parallel wired connection, and/or the like. Network 160 may be either a wireless network, or a wired network. Network 160 may further be connected to other networks. According to a further example embodiment, apparatus 200 may be a stationary device having a wireless and/or a wired interface for communicating with network 160.

As further shown in FIG. 1 various other devices, such as other mobile device 140 and server 300 including a database 310 may be connected to the network 160 via respective links (170 and 180) so that apparatus 200 may communicate with any of the other devices via the network 160.

According to one example, apparatus 200, such as a wireless communication device, upon initiating a wireless short-range communication with one or more other wireless communication devices, such as any of the devices 110, 120 or 130 through a wireless short-range communication link 190, needs to first perform device discovery to detect one or more of the devices 110, 120 and 130 within it's short-range communication coverage. After device detection, apparatus 200 may proceed with short-range communication link establishment in order to commence communication with one or more of the detected devices.

Figure 2:
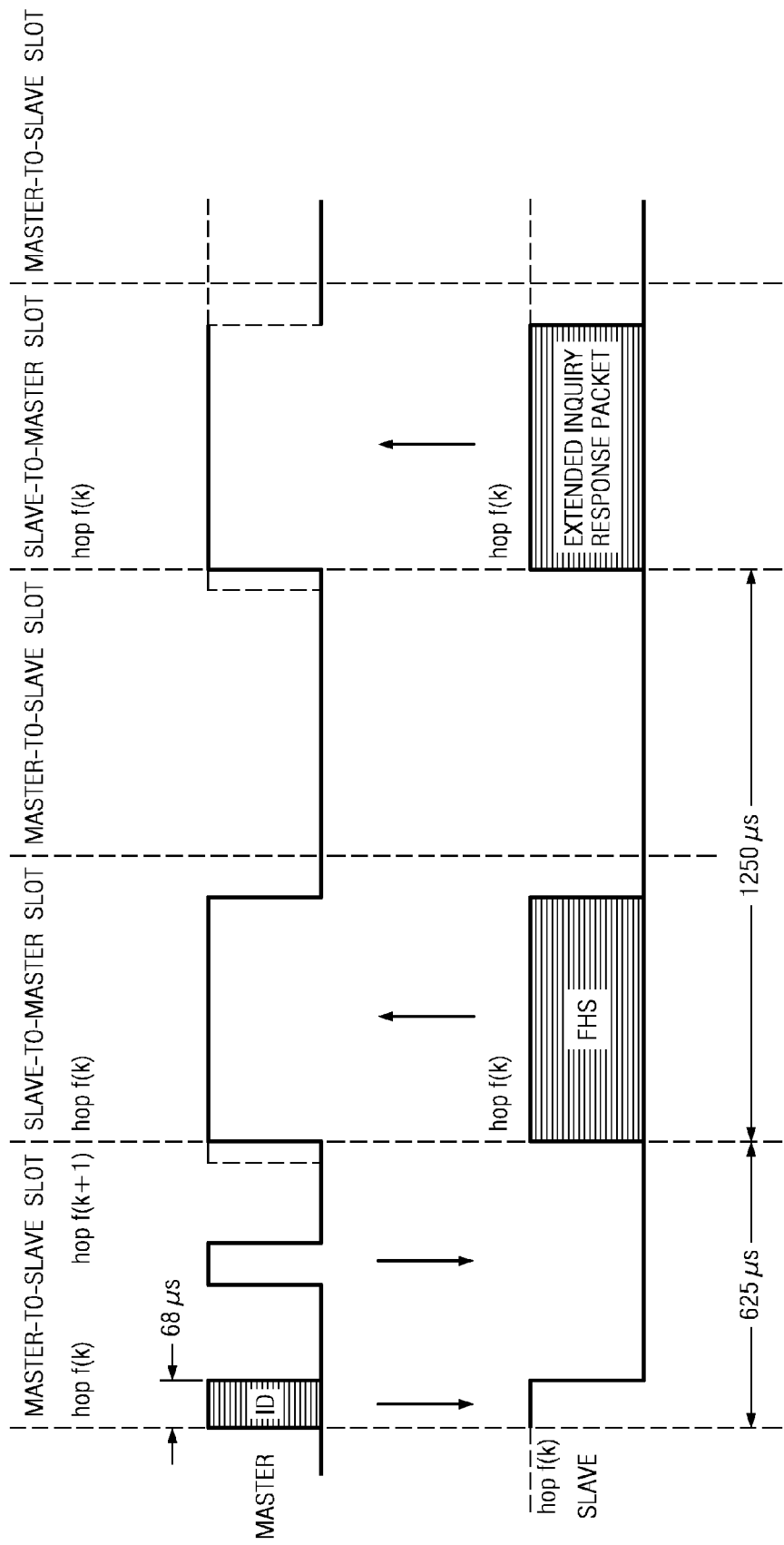
FIG. 2 illustrates an example Bluetooth™ communication protocol based device discovery with Extended Inquiry Response (EIR) procedure usable in accordance with at least one example embodiment.

An example device discovery scenario usable in accordance with at least one example embodiment is illustrated in FIG. 2. This example discloses Bluetooth™ communication protocol based device discovery with Extended Inquiry Response (EIR) procedure. It should be noted that Bluetooth™ communication protocol in this context is intended to be used only as an example, and thus, other wireless communication protocols may be employed in implementing one or more embodiments of the present invention. Initially an apparatus, such as apparatus 200 of FIG. 1, may be configured to perform a Bluetooth™ Inquiry, i.e. trying to detect other Bluetooth™ devices within its coverage, by transmitting one or more ID packets. These ID packets transmitted by the apparatus do not contain any information about the source or recipient of the transmissions. However, the packets may indicate which class of devices should respond. Bluetooth™ Core Specification, version 4.0, published on Jun. 30, 2010 provided by Bluetooth™ Special Interest Group (SIG) for example at www.bluetooth.org defines one general inquiry access code (GIAC) to inquire for any type of device, and multiple dedicated inquiry access codes (DIAC) that only inquire for certain type of device to respond to the ID packet.

Bluetooth™ Inquiry procedure may be performed in order to find discoverable Bluetooth™ devices within transmission range. As shown in FIG. 2, Inquiring device is a Master and any responding device is a Slave. Default duration of a Bluetooth™ Inquiry scan is 11.25 ms when performing a standard scan and 22.5 ms when performing an interlaced scan. Default value for a Bluetooth™ Inquiry scan interval is 2.56 s. In the example of FIG. 2, the master-to-slave slot duration is 625 µs, and the total master-to-slave and slave-to-master slot duration is 1250 µs. Apparatuses in a discoverable mode that receive Bluetooth™ Inquiry packets, such as one or more ID packets that typically have a duration of 68 µs, may transmit a response including a Frequency Hop Synchronization (FHS) packet.

As illustrated on the example Bluetooth™ communication protocol based device discovery with Extended Inquiry Response (EIR) of FIG. 2, an Extended Inquiry Response (EIR) packet may be transmitted by the responding device subsequent to the transmission of the FHS packet. The EIR packet may contain miscellaneous information in addition to what is delivered in the basic inquiry response (i.e. FHS packet). EIR packets may comprise information regarding, for example, services offered by the apparatus or some vendor specific information. The impending transmission of an EIR packet may be indicated by an EIR indicator bit that is set in the FHS packet. If it is indicated in the FHS packet that an EIR packet follows (i.e., the EIR bit is set), transmission of the EIR packet transmission initiates in the next slave-to-master slot. EIR packets may be asynchronous connectionless link (ACL) packets of type DM1, DM3, DM5, DH1, DH3 or DH5.

Figure 3:
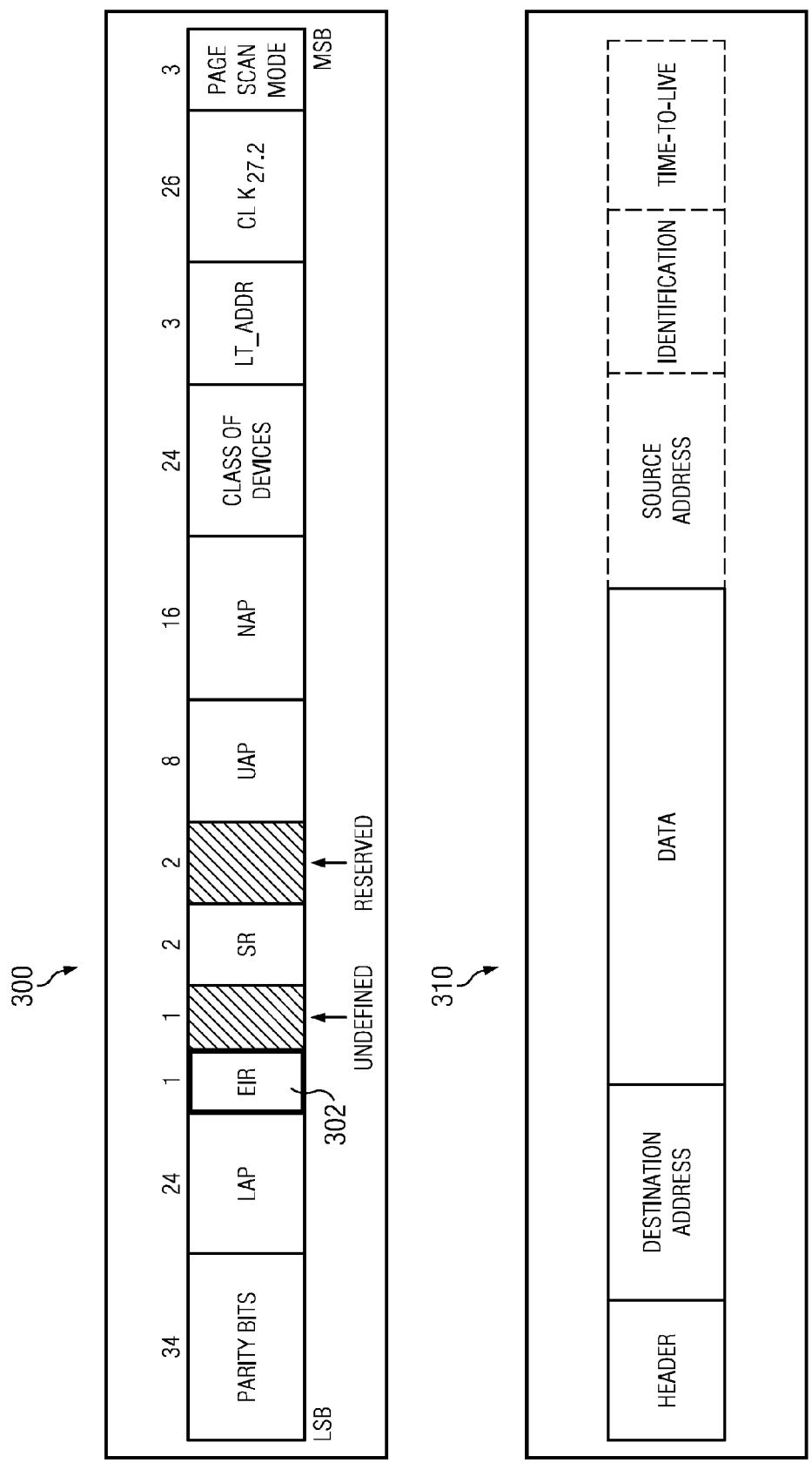
FIG. 3 illustrates example data formats of information included in Frequency Hopping Synchronization (FHS) and Extended Inquiry Response (EIR) packets, usable in accordance with at least one example embodiment.

Example data format included in a FHS packet usable e.g. in connection with the example Bluetooth™ communication protocol based device discovery with Extended Inquiry Response (EIR) of FIG. 2, includes various elements as defined in the existing Bluetooth™ Core Specification, version 4.0, published on Jun. 30, 2010 provided by Bluetooth™ Special Interest Group (SIG) for example at www-.bluetooth.org. FIG. 3 illustrates data elements of an example FHS packet 310 usable in connection with the example Bluetooth™ communication protocol comprising at least a Bluetooth device address, device class, indication whether an Extended Inquiry Response (EIR) follows the FHS packet, Bluetooth™ Page scan mode and clock phase. More specifically, as illustrated on FIG. 3, the example FHS packet 300 comprises an EIR indicator 302. The EIR indicator 302 may be set in order to indicate that an EIR packet follows the FHS packet 300 similarly as illustrated in the example Extended Inquiry Response (EIR) procedure of FIG. 2.

An example data format of an EIR packet usable e.g. in connection with the example Bluetooth™ communication protocol based device discovery with Extended Inquiry Response (EIR) of FIG. 2 includes various elements as defined in the existing Bluetooth™ Core Specification, version 4.0, published on Jun. 30, 2010 provided by Bluetooth™ Special Interest Group (SIG) for example at www-.bluetooth.org. FIG. 3 illustrates data elements of an example EIR packet 310, which includes (not in any particular order) header information, data pending for transmission and a destination address, which may be a basis for conveying the pending data to a particular destination device. In addition, the EIR packet 310 may optionally include a source address, identification information and time-to-live information. The source address is optional in the EIR packet 310 since in some instances it may be determined from the FHS packet 300 that preceded the EIR packet 310. Identification information may pertain to, for example, sequence numbering for the EIR packet, while time-to-live information may pertain to the "freshness" of the included data. One or both of identification and time-to-live information may be utilized in determining if the data included in the EIR packet 310 is still valid data. For example, if the EIR packet 310 is received by an apparatus out-of-sequence, wherein a preceding packet received by the apparatus is newer than the current packet as indicated by the identification information, then the data in the EIR packet 310 may be deemed invalid. Similarly, if the EIR packet 310 is received in the apparatus after the time-to-live information in the packet indicates (e.g., via a duration, set time, etc.) the data as still valid, the receiving apparatus may deem that the data within the EIR packet 310 is invalid.

Figure 4:
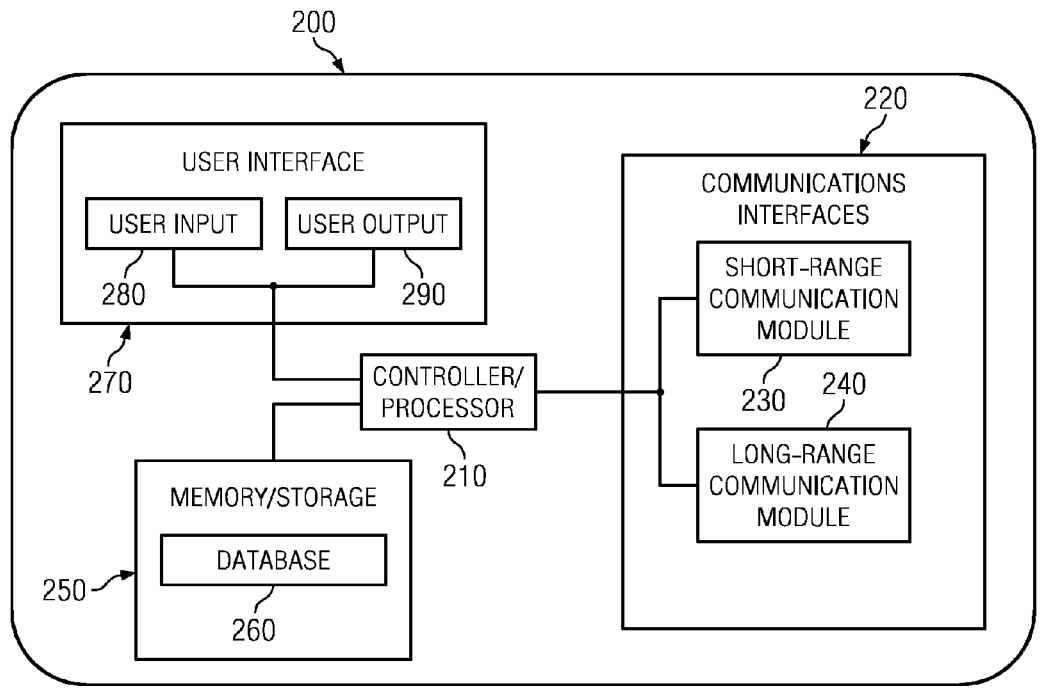
FIG. 4 discloses a modular layout for an example apparatus according to an example embodiment of the present invention.

FIG. 4 discloses a modular layout for an example apparatus according to an example embodiment of the present invention. In FIG. 4, apparatus 200 of FIG. 2 is broken down into modules configured to cause the apparatus to perform various functionalities. The functionalities may be provided by various combinations of the software and/or hardware components discussed below according to an embodiment of the present invention.

Control module 210 is configured to regulate operation of the apparatus 200. The control module may be embodied as a controlling means, for example as a controlling circuitry or a processor. Inputs for the control module 210 may be received from various other modules comprised within apparatus 200. For example, user interface 270 may provide input to the control module 210 in response to receiving input from a user via user input 280. So, user input received via the user interface 270 may be used as an input in the control module 210 for controlling the operation of the apparatus 200. Control module 210 may interpret and/or process the input data and, in response, may issue one or more control commands to at least one of the other modules within apparatus 200.

In accordance with an example embodiment, apparatus 200, embodied for example as a wireless communication device, comprises communications interfaces 220. Communications interfaces 220 may incorporate one or more communication modules of the apparatus 200. In an example embodiment, the communications interfaces 220 may comprise means for wired and/or wireless communication. As shown in the example of FIG. 4, communications interfaces 220 may comprise a short-range communications module 230 and a long-range communications module 240. It should be understood that although FIG. 4 illustrates only one short-range communication module 230 and one long-range communication module 240 for the sake of clarity, apparatus 200 may comprise any number of further communications modules. For example, two or more additional wired and/or wireless communication modules may be included in the apparatus 200. Apparatus 200 may utilize one or more of these modules to receive information from both local and long distance sources, and to transmit data to recipient devices from apparatus 200. Communications interfaces 220 may be activated by control module 210, or by control resources local to the sub-modules responding to received messages, environmental influences and/or other devices in communication with the apparatus 200.

Short-range wireless networks provide communication solutions that avoid some of the problems seen in large cellular networks. Bluetooth™ is an example of a short-range wireless technology quickly gaining acceptance in the marketplace. Bluetooth™ enabled wireless communication device may transmit and receive data rates from 720 Kbps up to 2-3 Mbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ and Bluetooth™ Low Energy, other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

Short-range communication module 230 may comprise short-range communication interface embodied for example as a transmitter and/or receiver for exchanging information across short-range wireless network using a short-range communication protocol. Example communication protocols for short-range communication may comprise Bluetooth™, Bluetooth™ Low Energy, wireless local area network (WLAN), ultra-wide band (UWB), and wireless universal serial bus (WUSB) technologies. Bluetooth™ Low Energy communication protocol provides a security enhancing feature for creating temporary identification information that may be used to mask actual identification of the wireless communication device. The temporary identification information may be used by other devices in communicating with the apparatus 200. However, only other devices possessing secret address component information may determine the actual identity of the masked wireless communication device. The temporary identification information may further be recompiled when a threshold condition is satisfied.

Long-range communication module 240 may comprise a long-range communications interface configured to communicate and exchange information over a long distance in a large geographic area using any of the wide-area communication technologies described earlier. Examples of wireless long-range communication technologies comprise $2^{nd}$ generation (2G) digital cellular networks, for example Global System for Mobile Communications (GSM) that may communicate in the 900 MHz/1.8 GHz bands in Europe and in the 850 MHz and 1.9 GHz bands in the United States. Long-range communication technologies may further comprise general packet radio service (GPRS) technology, universal mobile telecommunications system (UMTS) technology, code division multiple access (CDMA) technologies, and/or the like. Long-range communication technologies may also operate to transmit and receive messages, such as text messages via a short messaging service (SMS), and/or multimedia content via multimedia messaging service (MMS) messages. Long-range communication technologies may provide voice and data services.

As a subset of long-range communications module 240, or alternatively operating as an independent module separately coupled to processor 210, the apparatus 200 may comprise a broadcast receiver. The broadcast receiver may be a digital audio- or video receiver, for example a digital audio broadcasting (DAB) or a digital video broadcasting (DVB) receiver, and/or the like. According to an example embodiment, the broadcast receiver comprises a Digital Video Broadcast for Handheld Apparatuses (DVB-H) receiver. The broadcasting transmissions may be encoded so that only certain apparatuses may access the transmitted content. The broadcast transmission may comprise text, audio and/or video information, and data. In an example embodiment, apparatus 200 may receive broadcasts and/or information within the broadcast signal to determine if the apparatus is permitted to view the received content.

According to one example embodiment either the short-range communications module 230, or the long-range communications module 240 may be equipped with a wired interface that may be used for communicating with another device using a wired communication protocol via an interface such as Ethernet, an IEEE 1394 communication interface, a universal serial bus (USB) interface, and/or the like.

User interface 270 may include visual, audible and/or tactile elements which allow a user to receive data from, and enter data into, the apparatus. Data entered by a user is received via user input module 280 and may be interpreted by control module 210, for example to affect the behavior of apparatus 200. User-inputted data may also be transmitted via any of the communication modules of the communications interfaces 220 to another device. Information may also be received by other devices at the apparatus 200 via communications interfaces 220. Control module 210 may cause this information to be transferred to user interface 270 for presentation to the user via user output module 290. User interface 270 may comprise one or more user input and output modules, and there may also be a module operating both as a user input module 280 and user output module 290, for example a touch screen display operating as a tactile user interface.

Apparatus 200 may further comprise a memory and/or storage 250. Memory/storage 250 may be connected to controller 210. Memory/storage 250 may include a database 260. The database 260 may comprise one or more data items, such as information related to original identification of the apparatus, and related data items for creating private address for masking the original identity of the apparatus 200. Memory/storage 250 may further store executable instructions that are configured to cause the apparatus 200 to perform various actions in co-operation with the control module 210.

According to one embodiment of the present invention, bidirectional communication without establishing a formal communication connection is provided with a device detection procedure where an apparatus, such as apparatus 200 of FIG. 1, transmits a message to detect one or more wireless communication devices within its coverage. Upon receiving at least one response message comprising at least identification information regarding a wireless communication device within the coverage, the apparatus is configured to determine whether it has data suitable for transmitting to the detected wireless communication device without establishing a formal communication connection. If such data exists, the apparatus is further configured to transmit one or more subsequent messages to the detected wireless communication device, wherein the one or more subsequent messages comprise at least the data suitable for transmitting to the detected wireless communication device without establishing a formal communication connection.

Figure 5:
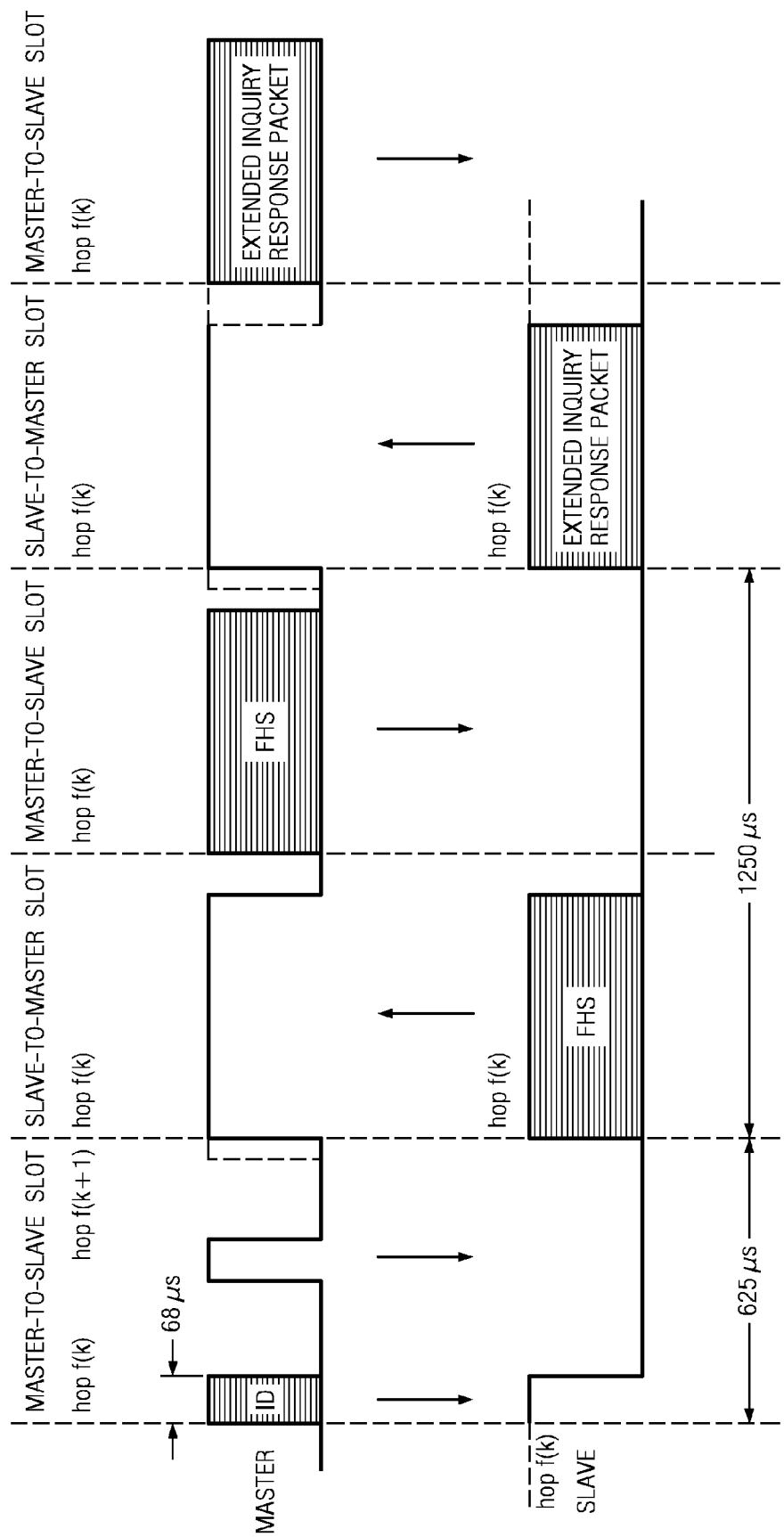
FIG. 5 illustrates an example Bluetooth™ communication protocol based device discovery with Extended Inquiry Response (EIR) procedure usable in accordance with at least one example embodiment of the present invention.

An example scenario for bidirectional communication scheme according to Bluetooth™ communication protocol based device discovery with Extended Inquiry Response (EIR) procedure usable in accordance with at least one example embodiment of the present invention is illustrated on FIG. 5. Similarly to FIG. 2, an apparatus, such as apparatus 200 of FIG. 1, may be configured to try detecting other, discoverable Bluetooth™ devices within its coverage, by transmitting one or more ID packets. According to one embodiment, the inquiring device may indicate the extended inquiry procedure in the ID packet by using a dedicated ID packet code. As shown in the example of FIG. 5, inquiring device is assumed as a Master and any responding device is a Slave. Similarly to the example of FIG. 2, the master-to-slave slot duration is 625 µs, and the total master-to-slave and slave-to-master slot duration is 1250 µs. Apparatuses in a discoverable mode that receive Bluetooth™ Inquiry packets, such as one or more ID packets that typically have a duration of 68 µs, may transmit a response including a Frequency Hop Synchronization (FHS) packet as shown in the example of FIG. 5.

As illustrated on the example Bluetooth™ communication protocol based device discovery with Extended Inquiry Response (EIR) of FIG. 5, the inquiring device may transmit, in response to the received Frequency Hop Synchronization (FHS) packet, a Frequency Hop Synchronization (FHS) packet of its own in the next master-to-slave slot to inform that it has data for communication in a subsequent Extended Inquiry Response (EIR) packet to be transmitted in the next master-to-slave slot. The FHS packet sent by the master device may have the same structure as the FHS packet sent by the responding device and shown on FIG. 4. In the example of FIG. 5, both the inquiring device and the responding device have indicated in their respectively transmitted FHS packets that an EIR packet follows by setting corresponding EIR indicator shown on the example FHS packet of FIG. 3. It should be noted that according to one or more embodiments of the present invention, the inquiring device may indicate impending transmission of an EIR packet irrespective whether the responding device includes such an indication in its FHS packet. The EIR packet transmitted by the inquiring device may contain miscellaneous information in addition to what is delivered in the basic inquiry response (i.e. FHS packet). EIR packets transmitted by the inquiring device may comprise information regarding, for example, services offered by the apparatus or some vendor specific information. If the inquiring device indicated in the FHS packet that an EIR packet follows (i.e., the EIR bit is set), it is sent in the next master-to-slave slot. EIR packets transmitted by the inquiring device may be asynchronous connectionless link (ACL) packets of type DM1, DM3, DM5, DH1, DH3 or DH5.

In accordance with at least one embodiment of the present invention, device detection messages may be employed for delivering data, such as short information messages regarding a specific application, between apparatuses that are not already participating in a previously established wireless network. Since apparatuses are not required to operate in a synchronized wireless network, any devices that depart from, or enter into transmission range of ongoing interactions may do so without causing any disruption. According to at least one example embodiment of the present invention, Extended Inquiry Response (EIR) packets of the example Bluetooth™ communication protocol based device discovery with Extended Inquiry Response (EIR) may be used to convey data by adding messages that are composed on an apparatus to an EIR packet. Received messages originating from other apparatuses but intended for another recipient device may also be attached to EIR packets for retransmission, and thus, the probability of a message arriving at its target destination may be increased. The behavior wherein received messages may be retransmitted if not intended for a receiving device may also help to propagate messages to a larger pool of recipients than the immediate area defined by the radio range of the apparatus.

As an example, exchanged information may comprise application data, such as data relating to a specific messaging or "chat" application. So, according to at least one embodiment of the present invention, "chat" groups may be formed between multiple apparatuses without the need to first establish networked relationships by using the device detection messages for delivering data. Accordingly, apparatuses may simply create device detection response messages that include dedicated chat information, such as chat group identification and actual chat content etc. When users desire to check if any chat groups available, they may just perform inquiries and collect chat group identification information from apparatuses within transmission range. If a user would like to join to a certain chat group, all information (e.g., short messages transmitted in extended inquiry responses) may be transmitted including an identification corresponding to the certain chat group. There may also be multiple chat groups that are active at the same time and in the same place, and thus, filtering may be done by the application utilizing the data provided in the EIR packets.

In accordance with at least one embodiment of the present invention, device detection messages, such as the Frequency Hop Synchronization (FHS) and Enhanced Inquiry Response (EIR) packets shown in connection with the Bluetooth™ communication protocol based device discovery with Extended Inquiry Response (EIR) of FIG. 2, may be used to deliver data between apparatuses without performing any kind of connection setup procedure.

Figure 6:
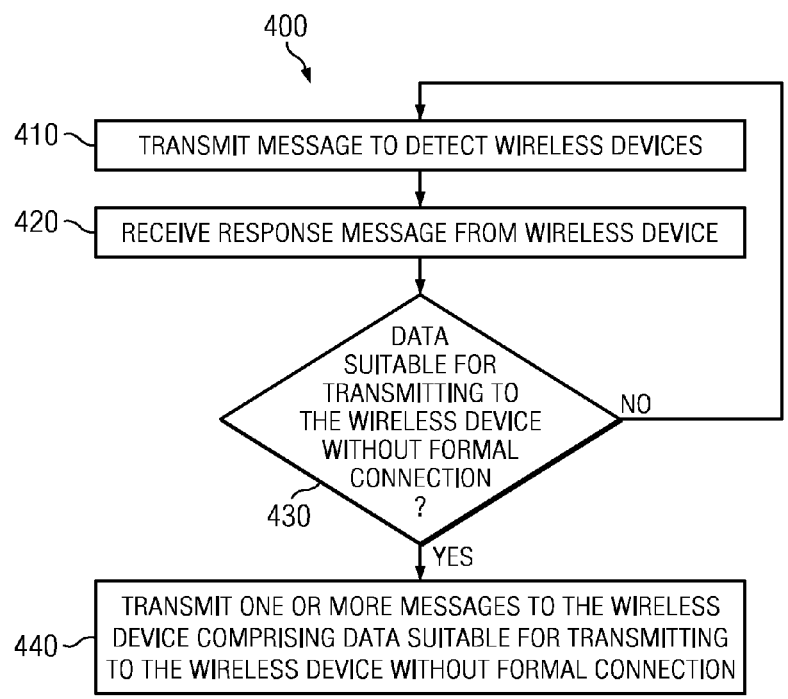
FIG. 6 illustrates an example flow diagram showing operations for transmitting one or more messages to a detected device without establishing a formal connection according to an example embodiment of the present invention.

FIG. 6 illustrates an example method 400 for transmitting one or more messages to a detected device without establishing a formal connection according to an example embodiment of the present invention. Example method 400 starts with block 410 where an apparatus, such as the wireless communication device 200 of FIG. 1, transmits one or more messages to detect one or more wireless devices, such as wireless communication device 120 of FIG. 1. Example apparatus 200 may then receive in block 420 at least one response message comprising at least identification information regarding a wireless communication device, such as the wireless communication device 120 of FIG. 1. Upon receiving the at least one response message, apparatus 200 is aware of the identification information of other devices present in the coverage so apparatus 200 has now detected one or more wireless communication devices within its coverage. In response to receiving the at least one response message, method continues with a decision block 430, where the example apparatus 200 may determine whether there is data suitable for transmitting to the at least one detected wireless communication device without establishing a formal communication connection.

Decision block 430 may include one or more separate decisions based on for example determination of the characteristics of pending data. For example, if pending data is not suitable for inclusion in one or more subsequent messages due to for example large amount of the data, or if the data is related to an application requiring wireless communication connection between devices, it is determined that said data is not suitable for transmitting to the at least one detected wireless communication device. Similarly, if the pending data is not intended for the at least one detected wireless communication device, a decision may be made that the data is not suitable for transmitting to the at least one detected wireless communication device. Alternatively, even though the pending data is not intended for the at least one detected wireless communication device, a decision may be made that the data is suitable for transmitting to the at least one detected wireless communication device in order to improve distribution of said data within the environment. If the decision block 430 indicates that there is no data suitable for transmitting to the at least one detected wireless communication device, the method may go back to block 410. Alternatively, a communication connection may be established with the at least one detected device in a conventional manner. In contrast, if the decision block 430 indicates that there is pending data suitable for transmitting to the at least one detected wireless communication device without establishing a formal communication connection, the method continues with block 440, where the apparatus, such as apparatus 200 of FIG. 1, transmits one or more subsequent messages to the detected wireless communication device, such as wireless communication device 120, wherein the one or more subsequent messages comprise at least the pending data without establishing a formal communication connection. Communication shown in the example method 400 may be considered as an example of non-networked communication where apparatus exchanges one or more messages including payload and/or application data with a detected device without establishing a formal communication connection with the detected device.

FIG. 7 illustrates an example method 500 showing operations for receiving one or more messages without establishing a formal communication connection according to an example embodiment of the present invention. Example method 500 starts with block 510 where an apparatus, such as wireless communication device 120 of FIG. 1, receives one or more messages for detecting said apparatus. Source of the one or more messages may be for example apparatus 200 of FIG. 1. In response to the one or more received messages, a response message comprising at least identification information regarding the apparatus is transmitted in block 520. Method 500 continues with block 530 where one or more subsequent messages is received in response to the transmitted response message, wherein the one or more subsequent messages comprise at least data suitable for receiving without establishing a formal communication connection with the apparatus, such as apparatus 200 of FIG. 1, originating the messages. Communication shown in the example method 500 may be considered as an example of non-networked communication where apparatus exchanges one or more messages including payload and/or application data with another device without establishing a formal communication connection with the other device.

FIG. 8 illustrates an example method 600 for Bluetooth™ communication protocol based message transmission without establishing a formal connection according to an example embodiment of the present invention. Example method 600 starts with block 610 where an apparatus, such as the wireless communication device 200 of FIG. 1, transmits one or more ID packets to detect one or more discoverable Bluetooth™ devices within its coverage, such as wireless communication device 120 of FIG. 1. Example apparatus 200 may then receive in block 620, in response to the transmitted one or more ID packets, at least one response including at least a Frequency Hop Synchronization (FHS) packet from at least one discoverable Bluetooth™ device. According to one embodiment, the received FHS packet corresponds with the example FHS packet illustrated in FIG. 3. The received FHS packet includes at least identification information regarding the wireless short-range communication device. Upon receiving the at least one FHS packet, apparatus 200 is aware of the identification information of discoverable Bluetooth™ devices present in the coverage.

Method 600 continues with decision block 630, where the example apparatus 200 determines whether there is data suitable for transmitting to the at least one detected wireless communication device without establishing a formal communication connection. Decision block 630 may include one or more separate decisions based on for example determination of the characteristics of pending data. For example, if pending data is determined to be not suitable for inclusion in one or more subsequent messages due to for example large amount of the data, or if the data is related to an application requiring wireless communication connection between devices, it is determined that said data is not suitable for transmitting to the at least one detected wireless communication device. Similarly, if the pending data is not intended for the at least one detected wireless communication device, a decision may be made that the data is not suitable for transmitting to the at least one detected wireless communication device. Alternatively, even though the pending data is not intended for the at least one detected wireless communication device, a decision may be made that the data is suitable for transmitting to the at least one detected wireless communication device in order to improve distribution of said data within the environment. If the decision block 630 indicates that there is no data suitable for transmitting to the at least one detected wireless communication device, the method may go back to block 610. Alternatively, a Bluetooth™ communication connection may be established with the at least one detected device in a conventional manner.

If decision block 630 indicates that there is pending data suitable for transmitting to the at least one detected wireless communication device without establishing a formal communication connection, the method continues with block 640, where the apparatus, such as apparatus 200 of FIG. 1, transmits a Frequency Hop Synchronization (FHS) packet. The transmitted FHS packet includes at least identification information regarding the apparatus and an indication of an additional extended inquiry response (EIR) packet to be transmitted in subsequent master-to-slave slot. According to one embodiment, the transmitted FHS packet includes various information fields shown in connection with the example FHS packet illustrated in FIG. 3. Thereafter, method 600 continues with block 650, where the EIR packet including the data suitable for transmitting to the detected Bluetooth™ device without establishing a formal Bluetooth communication connection is transmitted. Communication shown in the example method 600 may be considered as an example of non-networked communication where apparatus exchanges one or more messages including payload and/or application data with a detected device without establishing a formal Bluetooth™ communication connection with the detected device.

FIG. 9 illustrates an example method 700 for Bluetooth™ communication protocol based message receiving without establishing a formal connection according to an example embodiment of the present invention. Example method 700 starts with block 710 where an apparatus, such as wireless communication device 120 of FIG. 1, receives one or more ID packets for detecting said apparatus. Source of the one or more messages may be for example apparatus 200 of FIG. 1. In response to the one or more received ID packets, a Frequency Hop Synchronization (FHS) packet including least identification information regarding the apparatus is transmitted in block 720. Method 700 continues with block 730 where a Frequency Hop Synchronization (FHS) packet is received including at least identification information regarding the source of the FHS packet and an indication that an additional extended inquiry response (EIR) packet is to be received in a subsequent master-to-slave slot. Then, in block 740 the EIR packet is received including data suitable for receiving without establishing a formal communication connection with the source apparatus, such as apparatus 200 of FIG. 1, originating the EIR message. Communication shown in the example method 700 may be considered as an example of non-networked communication where apparatus exchanges one or more messages including payload and/or application data with another device without establishing a formal Bluetooth™ communication connection with the other device.

Without in any way limiting the scope, interpretation, or application of the claims appearing below, a technical effect of one or more of the example embodiments disclosed herein may be communicating payload and/or application data to another device without establishing a formal communication connection with the other device. Another technical effect may be bidirectional communication between devices without formal communication connection.

Various operations and/or the like described herein may be executed by and/or with the help of computers. Further, for example, devices described herein may be and/or may incorporate computers. The phrases "computer", "general purpose computer", and the like, as used herein, refer but are not limited to a media device, a personal computer, an engineering workstation, a personal digital assistant, a portable computer, a computerized watch, a wired or wireless terminal, phone, node, and/or the like, a set-top box, a personal video recorder (PVR), an automatic teller machine (ATM), a game console, and/or the like.

Embodiments of the present invention may be implemented in software, hardware, application logic or a combination of software, hardware and application logic. The software, application logic and/or hardware may reside on a memory of any of the apparatuses 200 and 300 of FIG. 1. In an example embodiment, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 10. A computer-readable medium may comprise a computer-readable storage medium that may be any media or means that may contain or store the instructions for use by or in connection with an instruction execution system, apparatus, or device, such as a computer.

Figure 10:
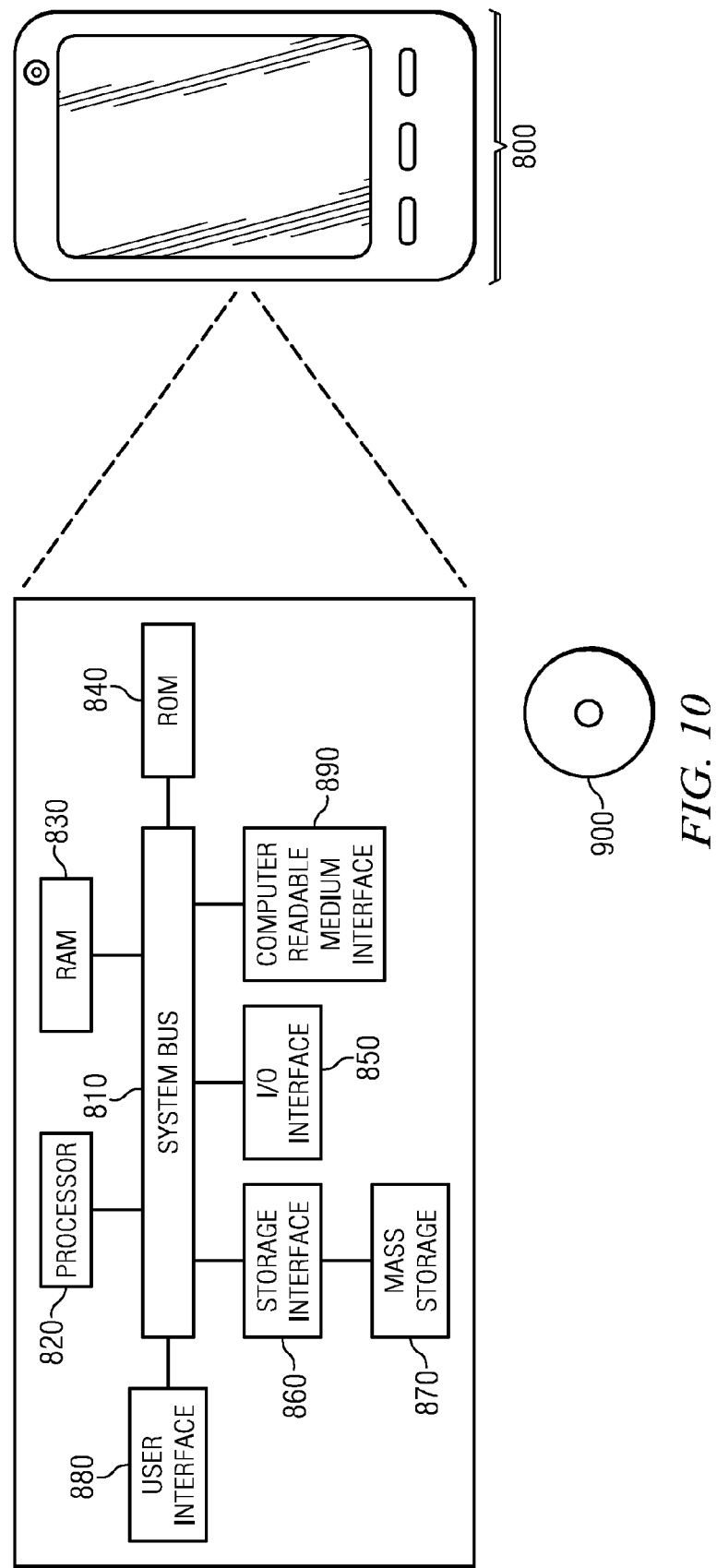
FIG. 10 discloses an apparatus comprising example hardware for implementing computer software instructions stored in the apparatus according to an example embodiment of the present invention.

The phrases "general purpose computer", "computer", and the like may also refer to one or more processors operatively connected to one or more memory or storage units, wherein the memory or storage may contain data, algorithms, and/or program code, and the processor or processors may execute the program code and/or manipulate the program code, data, and/or algorithms. Accordingly, example computer 800 as shown in FIG. 10 that may be considered as one embodiment of any of the apparatuses 110, 120, 130, 140 and 200 illustrated on FIG. 1 may include various hardware modules for causing the computer to implement one or more embodiments of the present invention. According to one example, the computer 800 include a system bus 810 which may operatively connect processor 820, random access memory 830, read-only memory 840 that may store for example a computer code for the computer 800 to perform on or more of the example methods illustrated on FIGS. 6-9. The system bus 810 may further operatively connect input output (I/O) interface 850, storage interface 6860, user interface 880 and computer readable medium interface 890. Storage interface 860 may comprise or be connected to mass storage 870.

Mass storage 870 may be a hard drive, optical drive, or the like. Processor 620 may comprise a microcontroller unit (MCU), a digital signal processor (DSP), or any other kind of processor. Computer 800 as shown in this example also comprises a touch screen and keys operating in connection with the user interface 880. In various example embodiments, a mouse, and/or a keypad may alternately or additionally be employed. Computer 800 may additionally include the computer readable medium interface 880, which may be embodied by a card reader, a DVD drive, a floppy disk drive, and/or the like. Thus, media containing program code, for example for performing method 400 of FIG. 6, may be inserted for the purpose of loading the code onto the computer.

Computer 800 may run one or more software modules designed to perform one or more of the above-described operations. Corresponding program code may be stored on a physical media 900 such as, for example, DVD, CD-ROM, and/or floppy disk. It is noted that any described division of operations among particular software modules is for purposes of illustration, and that alternate divisions of operation may be employed. Accordingly, any operations discussed as being performed by a software module may instead be performed by a plurality of software modules. Similarly, any operations discussed as being performed by a plurality of modules may instead be performed by a single module. It is noted that operations disclosed as being performed by a particular computer may instead be performed by a plurality of computers.

According to one embodiment, a computer program product is provided, the computer program product comprising computer executable program code recorded on a non-transitory computer readable storage medium, the computer executable program code comprising: A code for causing transmission of a message to detect one or more wireless communication devices within a coverage area of a computer device running the computer program; a code for causing receipt of at least one response message comprising at least identification information regarding a wireless communication device within the coverage area, in response to the transmitted message; a code for causing determination that the computer device has data suitable for transmitting to the detected wireless communication device without establishing a formal communication connection with the detected wireless communication device; and a code for causing transmission of one or more subsequent messages to the detected wireless communication device in response to the received response message, wherein the one or more subsequent messages comprise at least the data suitable for transmitting to the detected wireless communication device without establishing a formal communication connection.

According to one embodiment, a computer program product is provided, the computer program product comprising computer executable program code recorded on a computer readable storage medium, the computer executable program code comprising: A code for causing receipt of a message to detect a computer device running the computer program; a code for causing transmission of a response message comprising at least identification information regarding the apparatus in response to the received message; and a code for causing receipt of one or more subsequent messages in response to the transmitted response message, wherein the one or more subsequent messages comprise at least data suitable for receiving by the computer device without establishing a formal communication connection with a wireless communication device originating the messages.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor; and
   at least one memory including executable instructions, the at least one memory and the executable instructions being configured to, in cooperation with the at least one processor, cause the apparatus to perform at least the following:
   transmit an ID packet to detect one or more wireless short-range communication devices within a short-range communication coverage area of the apparatus;
   receive, in response to the transmitted ID packet, a frequency hopping synchronization (FHS) packet from at least one wireless short-range communication device within the coverage area, wherein the received FHS packet comprise at least identification information regarding the wireless short-range communication device;
   determine that information received in the received FHS packet establishes that the apparatus has pending data pre-stored for transmitting to the detected wireless short-range communication device;
   transmit a FHS packet comprising at least identification information regarding the apparatus and an indication of an additional extended inquiry response (EIR) packet in response to the received FHS packet; and
   transmit the EIR packet comprising the pending data pre-stored for transmitting to the detected wireless short-range communication device, without the apparatus and the detected wireless short-range communication device participating in a previously established wireless network.

2. An apparatus, comprising:
   at least one processor; and
   at least one memory including executable instructions, the at least one memory and the executable instructions being configured to, in cooperation with the at least one processor, cause the apparatus to perform at least the following:

receive an ID packet for detecting the apparatus;

transmit, in response to the received ID packet, a frequency hopping synchronization (FHS) packet comprising at least identification information regarding the apparatus;

receive, in response to the transmitted FHS packet, a FHS packet comprising at least identification information regarding a wireless short-range communication device originating the FHS packet and an indication of a subsequent extended inquiry response (EIR) packet; and receive the EIR comprising pending data pre-stored for receiving by the apparatus, even though the apparatus and the wireless short-range communication device are not already participating in a previously established wireless network.

* * * * *